Dec. 6, 1938.   A. OSOLIN   2,139,642
TENSIONING ASSEMBLY
Filed May 27, 1938   2 Sheets-Sheet 1
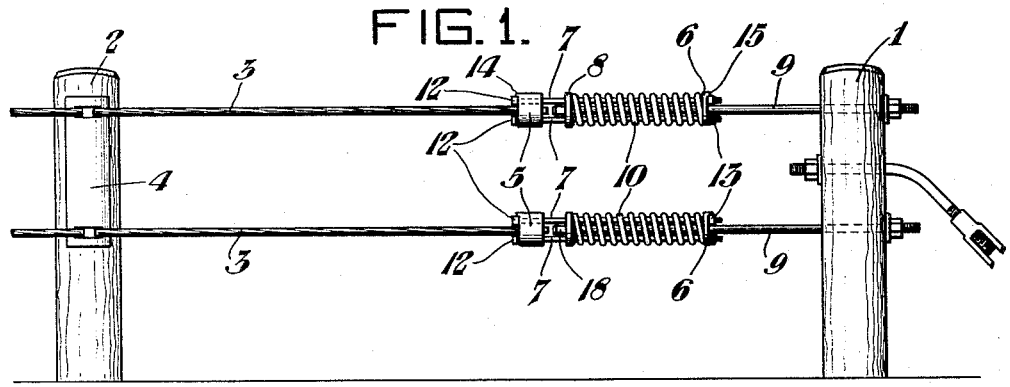
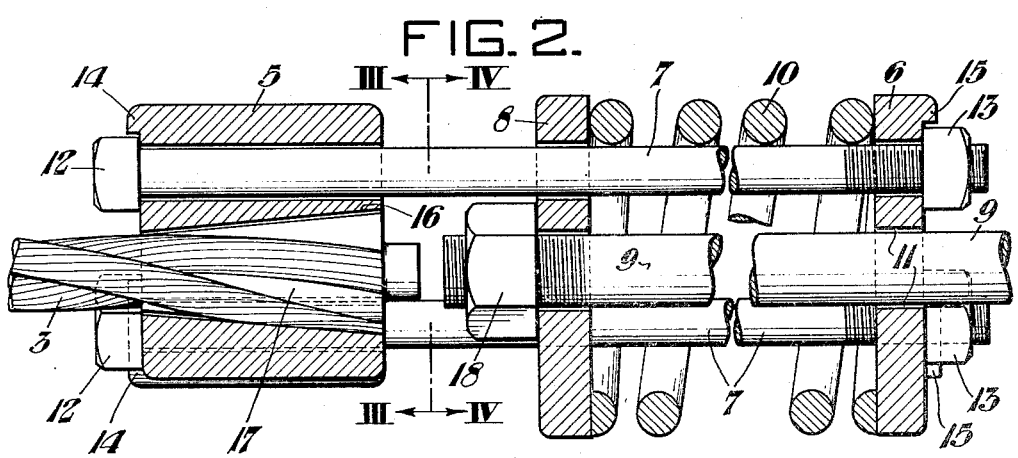
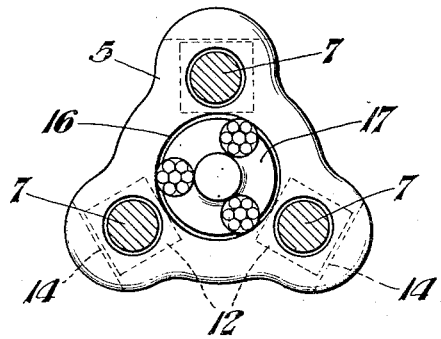 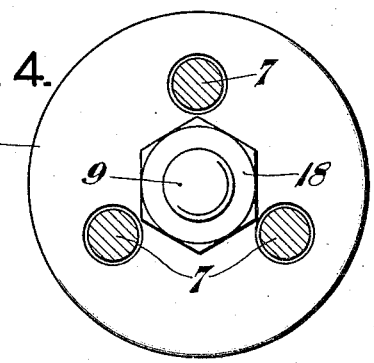
Inventor:
ALFRED OSOLIN,
by: John E Jackson
his Attorney.

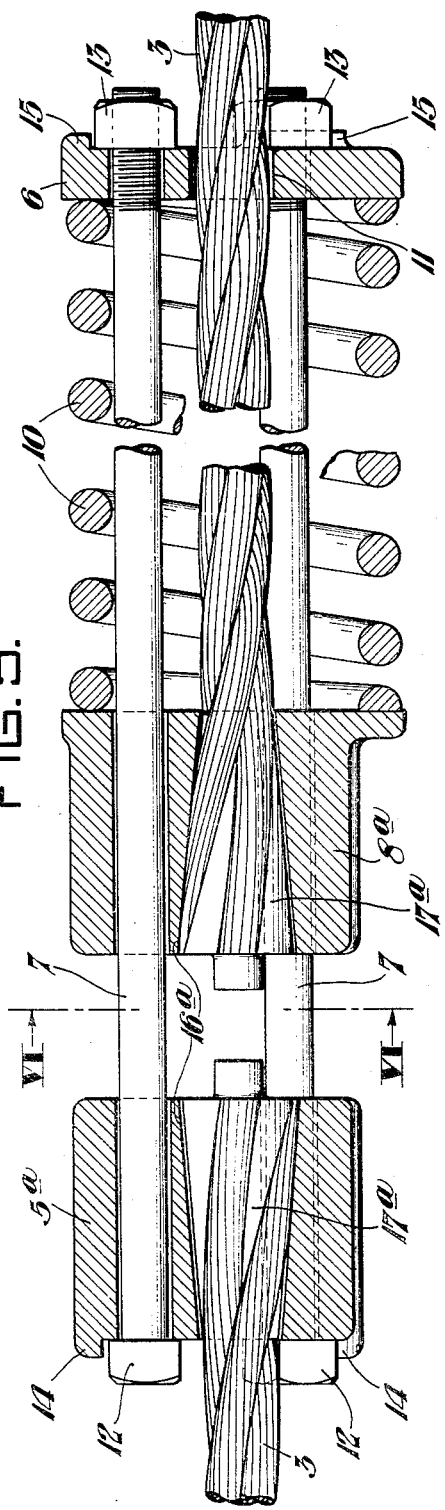
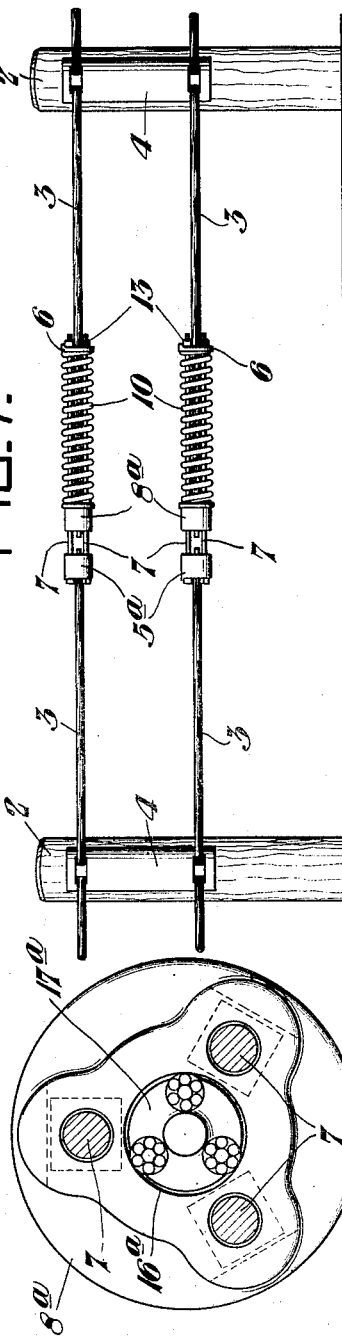
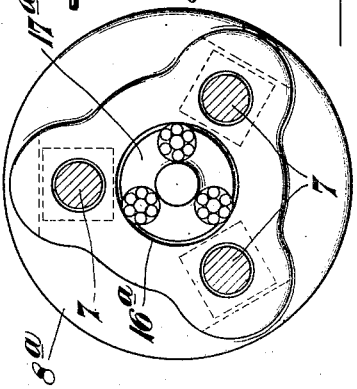

Patented Dec. 6, 1938

2,139,642

UNITED STATES PATENT OFFICE 2,139,642

TENSIONING ASSEMBLY

Alfred Osolin, Shaker Heights, Ohio, assignor to The American Steel and Wire Company of New Jersey, a corporation of New Jersey Application May 27, 1938, Serial No. 210,543

4 Claims. (Cl. 267—72)

This invention is an assembly for tensioning oppositely extending, aligned cable or bar elements. It is particularly adapted to tension the cables of a cable-type road guard, being able to function in this connection at the anchored ends of the cables or at positions therebetween.

Specific examples of the invention in the form of assemblies, suitable for the above particular use, are illustrated by the accompanying drawings, in which:

Figure 1 shows an assembly used at the anchored cable ends;

Figure 2 is a sectional enlargement;

Figures 3 and 4 are cross-sections taken from the lines III—III and IV—IV in Figure 2, respectively;

Figure 5 is a view similar to Figure 2 but showing the assembly used between the anchored cable ends;

Figure 6 is a cross-section taken from the line VI—VI of Figure 5; and,

Figure 7 shows the second named assembly in use.

More specifically, Figure 1 shows one of the end or anchoring posts 1 and the first one of the series of posts 2 mounting the cables 3 through what may be conventional brackets 4 permitting cable sliding. The cables 3 terminate at the anchoring post 1, and it is here that the assemblies shown by Figures 1 through 4 are used, these functioning to keep the cables 3 under tension, regardless of their thermal expansion and contraction.

In each instance, the assembly includes oppositely spaced parts 5 and 6, rods 7 interconnecting these parts, a reciprocative member 8 between the parts 5 and 6, the cable 3 connecting with the part 5 and an anchoring bar 9 with the member 8, and a compression-coil spring 10 between the part 6 and the member 8. The anchoring bar 9 is, of course, one of those connecting with the anchoring post 1.

The cable 3 terminates at the part 5, and the bar 9 terminates at the member 8, the part 6 having an opening 11 for the passage of the bar 9. The spring 10 surrounds the rods 7 and is held thereby concentric respecting the center line of the cable 3 and the bar 9, it being understood that the last two elements are alined.

Vandals have a habit of dismantling road guards, and to prevent this the rods 7 are in the form of long bolts having flat-sided heads 12 and provided with flat-sided nuts 13, these heads and nuts engaging the outsides of the parts 5 and 6, and the latter having lugs 14 and 15 engaging the flat sides of the heads 12 and nuts 13, when the assembly is functioning. To function properly, the coil spring 10 must be quite powerful so that vandals are normally unable to tamper with the assembly, it being necessary to move the parts 5 and 6 together against the pull of the cable 3 and the compression of the coil spring 10, to unscrew the nuts 13.

It is to be noted that the bolts 7 are equally spaced respecting each other, and concentrically grouped respecting the center line of the cable 3 and bar 9. Furthermore, three bolts are shown. Due to all this, the assembly carries the stresses involved in a proper manner, there being proper stress distribution with no stress concentrations on any one part not designed to carry the same.

It is to be understood that the required connections between the cable 3 and part 5, and the bar 9 and member 8, may be effected in any convenient manner. The drawings illustrate the part 5 as providing a conical cable-seat 16, a wedge 17 wedging the strands of the cable 3 in this seat, while the member 8 is a flat plate of circular outline and connecting with the bar 9 by reason of the latter having a threaded end on which a nut 18 is screwed to bear against the member 8.

The other assembly, shown by Figures 5 through 7, is substantially the same as that described excepting that it is used between two of the posts 2. To simplify the disclosure, the corresponding parts are similarly numbered, the parts of this other assembly being identified by the letter "a".

The primary difference between the two assemblies is that, in this second assembly, both the member 8ª and the part 5ª provide conical seats 16ª so that wedges 17ª may be used, whereby to connect the two ends of the oppositely extending cables. Obviously, the two assemblies involve the same principles.

I claim:

1. An assembly for tensioning oppositely extending, alined cable or bar elements, said assembly including oppositely spaced parts, rods interconnecting said parts, a reciprocative member between said parts, said elements respectively connecting with one of said parts and with said member, and a compression-coil spring between the other of said parts and said member, said elements terminating at said one of said parts and said member, and said other of said parts having an opening for the passage of the one of said elements extending from said member, said spring surrounding said rods and being held thereby concentric respecting said elements.

2. An assembly for tensioning oppositely extending, alined cable or bar elements, said assembly including oppositely spaced parts, rods interconnecting said parts, a reciprocative member between said parts, said elements respectively connecting with one of said parts and with said member, and a compression-coil spring between the other of said parts and said member, said rods being in the form of bolts having flat-sided heads and provided with flat-sided nuts, said heads and nuts engaging the outsides of said parts and the latter having lugs engaging the flat sides of said heads and said nuts when said assembly is functioning.

3. An assembly for tensioning oppositely extending, alined cable or bar elements, said assembly including oppositely spaced parts, rods interconnecting said parts, a reciprocative member between said parts, said elements respectively connecting with one of said parts and with said member, and a compression-coil spring between the other of said parts and said member, said rods being in the form of bolts having flat-sided heads and provided with flat-sided nuts, said heads and nuts engaging the outsides of said parts and the latter having lugs engaging the flat sides of said heads and said nuts when said assembly is functioning, said bolts being equally spaced respecting each other and concentrically grouped respecting said elements.

4. An assembly for tensioning oppositely extending, alined cable or bar elements, said assembly including oppositely spaced parts, rods interconnecting said parts, a reciprocative member between said parts, said elements respectively connecting with one of said parts and with said member, and a compression-coil spring between the other of said parts and said member, said elements terminating at said one of said parts and said member, and said other of said parts having an opening for the passage of the one of said elements extending from said member, said spring surrounding said rods and being held thereby concentric respecting said elements, said rods being in the form of bolts having flat-sided heads and provided with flat-sided nuts, said heads and nuts engaging the outsides of said parts and the latter having lugs engaging the flat sides of said heads and said nuts when said assembly is functioning, said bolts being equally spaced respecting each other and concentrically grouped respecting said elements.

ALFRED OSOLIN.